J. KOERNER.
FRUIT AND VEGETABLE MILL.
APPLICATION FILED MAR. 31, 1910.
967,393.
Patented Aug. 16, 1910.
3 SHEETS—SHEET 1.
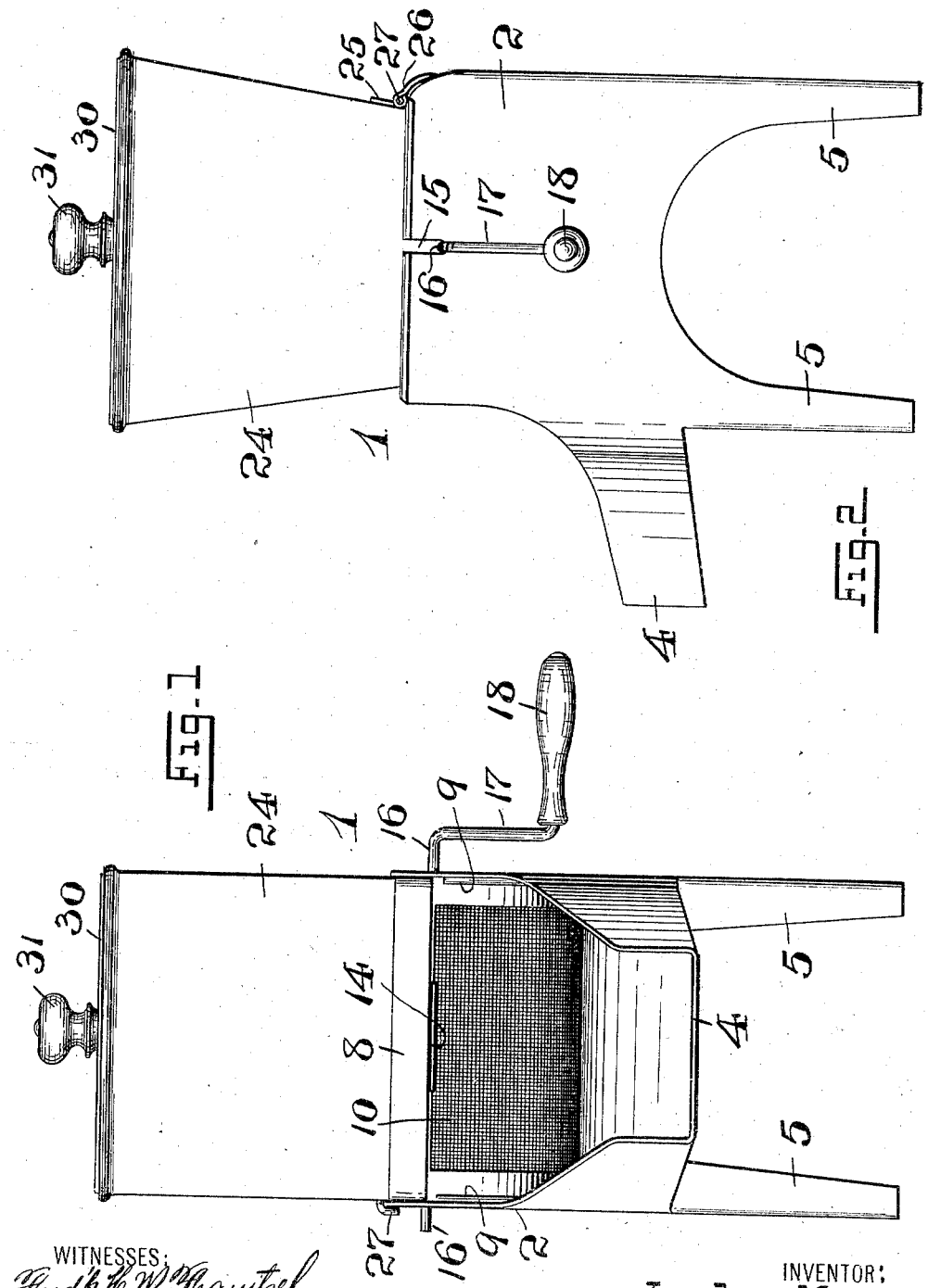

J. KOERNER.
FRUIT AND VEGETABLE MILL.
APPLICATION FILED MAR. 31, 1910.
967,393.
Patented Aug. 16, 1910.
3 SHEETS—SHEET 2.
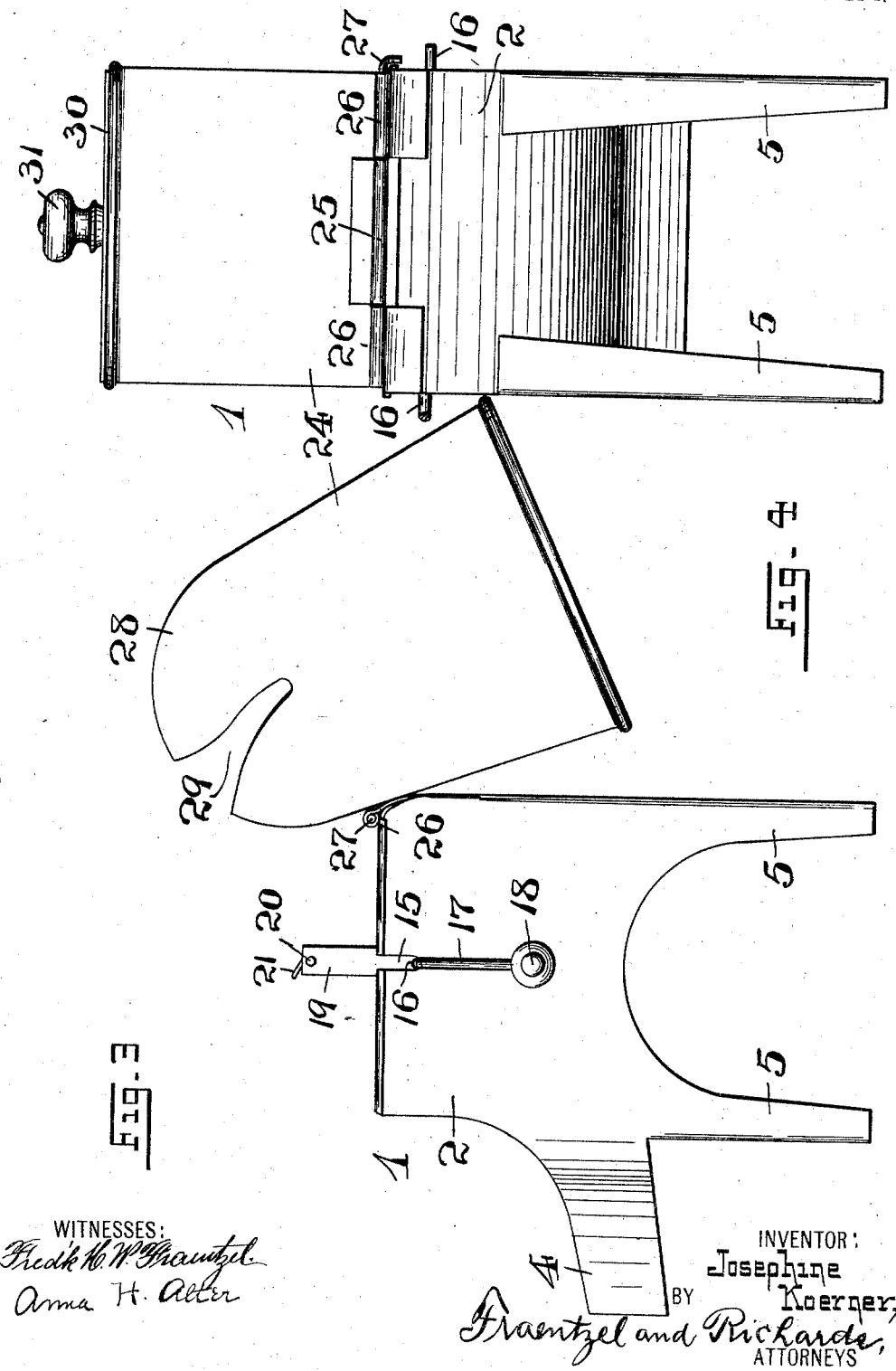
WITNESSES:
Fred'k H. W. Fraentzel
Anna H. Alter
INVENTOR:
Josephine Koerner,
BY Fraentzel and Richards,
ATTORNEYS

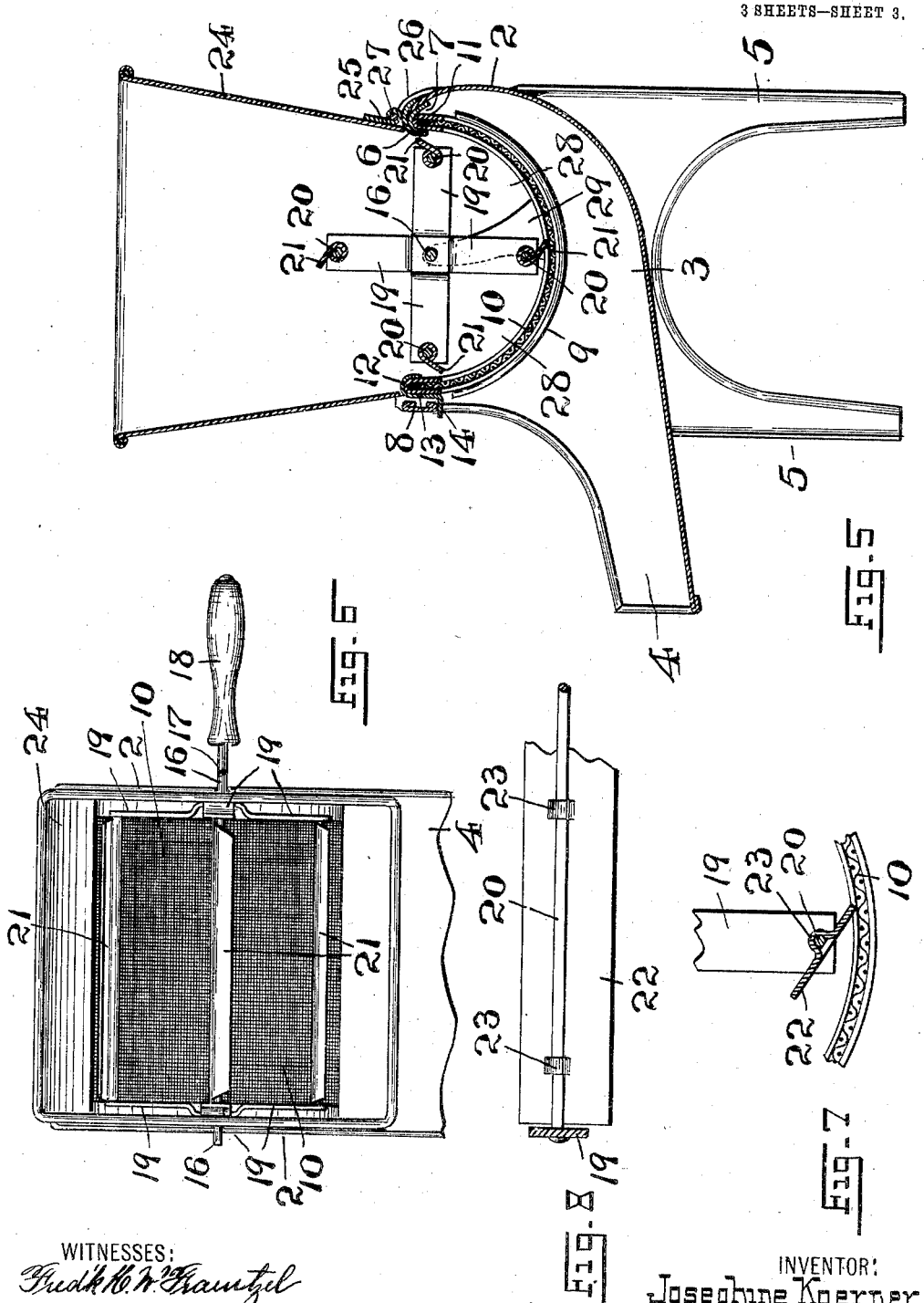

UNITED STATES PATENT OFFICE.

JOSEPHINE KOERNER, OF IRVINGTON, NEW JERSEY.

FRUIT AND VEGETABLE MILL.

967,393. Specification of Letters Patent. Patented Aug. 16, 1910.

Application filed March 31, 1910. Serial No. 552,503.

*To all whom it may concern:*

Be it known that I, JOSEPHINE KOERNER, a citizen of the United States, residing at Irvington, in the county of Essex and State of New Jersey, have invented certain new and useful Improvements in Fruit and Vegetable Mills; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in mills; and, the invention refers, more particularly, to that class of mills which are adapted to provide an apparatus for crushing and squeezing fruit, vegetables, and other matter, for the purpose of extracting the juices therefrom, and when desired the pulp, separating therefrom the seeds and skins.

The present invention has for its principal object to provide a simple and novel mill for the purposes above described; and, furthermore, in combination with a mill of the character hereinafter set forth, a hopper pivotally connected or hinged to the main body of the mill, so that the same can be opened to more easily clean the interior of both the hopper and trough of the mill; and, the parts being thus connected are more conveniently handled, and because of the fact that the hopper can not be separated from the main body of the mill, it can not be lost or misplaced, and is therefore always ready for use when the mill is to be used for mashing or grinding purposes.

A further object of this invention is to provide a rotatable dasher or crusher-member which may be easily removed for cleaning; and, furthermore, to provide in connection with said dasher or crusher a novel arrangement and construction of crusher-blades, which are most effective in their operation of catching and crushing the fruit or vegetables operated upon by the mill.

A still further object of the present invention is to provide the trough or interior of the main body of the mill with a removably disposed screen or colander-like body for the purposes of more easily keeping the parts clean and in a sanitary condition after use.

Other objects of the present invention not at this time more particularly enumerated will be clearly understood from the following detailed description of my present invention.

With these various objects of the present invention in view, the said invention consists, primarily, in the several novel arrangements and combinations of the various devices and parts, as well as in the details of the construction thereof, all of which will be more fully described in the following specification, and then finally embodied in the clauses of the claims which are appended to and which form an essential part of this specification.

The invention is clearly illustrated in the accompanying drawings, in which:—

Figure 1 is a front elevation of a fruit and vegetable mill or crusher showing one embodiment of the principles of the present invention; Fig. 2 is a side elevation of the same; and, Fig. 3 is a similar view, showing the pivoted or hinged hopper thrown back for the purpose of removing and replacing the screen within the interior part of the mill. Fig. 4 is a back or rear view of the fruit and vegetable mill, shown in said Figs. 1, 2 and 3; Fig. 5 is a central vertical cross-section of the mill; and Fig. 6 is a top or plan view of the same. Fig. 7 is a detail cross-section of a modified construction of crusher-blade for the dasher or crusher of said mill, illustrating the same in its operative relation with the screen or colander-device, a portion of which is shown in said view; and Fig. 8 is a view of the said crusher-blade, looking in a downward direction in said Fig. 7 and illustrating more particularly its manner of connection with the said dasher or crusher frame.

Similar characters of reference are employed in all of the hereinabove described views, to indicate corresponding parts.

Referring now to the several figures of the said drawings, the reference-character 1 indicates the complete fruit and vegetable mill, showing one embodiment of the principles of the present invention, the mill or crusher comprising generally, a body-portion 2, forming a trough 3 having an outwardly extending or discharging element in the form of a chute or delivery spout 4 extending from the bottom thereof. The said body-portion 2 is also provided with suitably shaped legs or standards 5, the same forming preferably an integral part of the said body-portion 2. The back upper marginal edge of said body-portion 2 is provided with an over-hanging lip or rib-like element, as 6, preferably in the form of an inverted U-shaped member, so as to provide a receiving channel 7, forming a suitable holding or retaining member for the purposes to be presently more fully set forth. Extending across the front of said body-portion 2 is a strut or bar 8, which is suitably secured at its ends to the side-walls of said body-portion 2. Secured, in any suitable manner, upon the inner surface of the side-walls of said body-portion 2 are suitable cleats or rests, as 9, which are suitably bent in semi-circular form for removably supporting a screen or colander-like member 10 which is also semi-cylindrical in form, and is preferably made of wire screen, but may be made of perforated sheet-metal, as will be clearly evident. In order to retain said screen or colander-like member 10 in its operative position or relation within the trough 3 of said body-portion 2, one of the marginal edge-portions, as 11, of the said screen or colander-like member 10, is inserted in said inverted U-shaped receiving channel or socket 7, formed by said overhanging lip or rib 6. The other horizontal marginal edge-portion 12 of said screen or colander-like member 10 is provided with a downwardly extending plate 13 which is formed with an outwardly extending lug or rib 14, said lug or rib providing a nosing or holding member which is adapted to be sprung under said strut or bar 8, and thereby securely retains said screen or colander-like member seated in its operative relation within said body-portion 2, upon the said semi-circular cleats or rests 9. It will be clearly understood, that when it is desired to remove said screen or colander-like member 10 from said body-portion 2, the said lug or rib 14 is pressed inwardly to disengage the same from its holding relation with said strut or bar 8, so that said screen or colander-like member 10, may be lifted out of said trough 3 of said body-portion 2. Each of the side-walls of said body-portion 2 is provided with a centrally disposed and downwardly extending slot 15, adapted to form oppositely situated bearings for the shaft or spindle 16 of a dasher or crusher-member. One end of said shaft 16 is provided with a downwardly extending arm 17 to which is affixed a handle or crank 18 for revolving said shaft 16, and the dasher- or crusher-member connected therewith. The said dasher or crusher-member is formed by providing said shaft 16 with two sets of radially disposed arms 19 which are secured upon said shaft 16 at points adjacent to each side-wall of the body-portion 2.

Extending between and affixed to the free ends of the respective arms 19 of each set of radially disposed arms, are carrier-rods 20 to which are affixed suitably formed dasher or crusher-blades 21. The said dasher or crusher-blades 21 are so secured and disposed upon their supporting or carrier rods 20, as to extend toward the screen or colander-like member 10 in a rearwardly extending angle with relation to the direction of revolution of said dasher or crusher-blades 21, so that they will catch and wedge the fruit or vegetables to be crushed against the surface of said screen or colander-like member 10, and thus force the juice and pulp through the latter. In the main construction, the said dasher or crusher-blades 21 are shown secured to their supporting or carrier-rods 20 in a fixed or stationary position with relation thereto, but referring more particularly to Figs. 7 and 8 of the drawings, there is illustrated therein a modified construction of dasher or crusher-blade, the same comprising a comparatively wider blade-member 22, from the body of which are struck out two or more suspending ears or loops 23 in which said supporting or carrier rods 20 may be journaled so as to pivotally suspend said blade-members thereon. The fruit or vegetables which are caught and forced beneath the upwardly extending portion of said blade-member 22, force the same upwardly, and owing to the pivotal connection of said blade-member, which acts as a fulcrum, the lower extending portion of said blade is consequently forced against the screen or colander-like member 10, whereby the juice and pulp of the fruit or vegetables are pressed through the screen, or the like, as will be clearly evident.

The reference-character 24 represents a hopper-like member, the same being provided with hinges 25 by means of which it is pivotally connected by means of a pintle 26 to ears 27 upon said body-portion 2, at the rear and upper marginal edge of the same, so that said hopper-like member may be turned back in order to facilitate an entrance into the trough 3 or interior of said body-portion 2 for the purposes of cleansing the same, and for removing both said dasher or crusher-member and the said screen or colander-like member, when they are to be cleansed. The said hopper-member 24 is provided upon each side with a downwardly projecting portion or member 28, the same being adapted to extend downwardly into the trough 3 of said body-portion 2 adjacent to the inner side-walls thereof. The said extensions or portions 28 are preferably of semi-circular configuration, so that the marginal edges thereof will correspond with the inner curve of said screen or colander-like member 10, upon which the end-marginal edges of said extensions or portions 28 rest, so as to provide an additional holding means for said screen or colander-like member 10, when the said hopper-member is caused to assume its normal relation with said body-portion 2. The said extensions or portions 28 are each provided with an upwardly extending curved slot, as 29, adapted to be fitted over and mounted upon the shaft 16 of said dasher or crusher-member, so as to provide a complete bearing for said shaft 16, and to prevent the upward thrust or displacement of said shaft and the dasher or crusher-member when the same is revolved. Said hopper-member may also be provided with a cover or closure, as 30, having a suitable handle-portion 31.

I claim:—

1. A mill comprising a trough-like body, said body having an outlet-chute extending therefrom, an inverted U-shaped lip extending along the rear upper marginal edge of said body, a bar extending across the front of said body, semi-circular cleats on the inner sides of the end-walls of said body, a screen removably supported upon the said cleats, said screen having one of its upper marginal edges inserted beneath and in holding engagement with said inverted U-shaped lip, and a locking device extending from another edge of said screen, said locking device being adapted to be forced in holding engagement with said bar, and a revoluble crusher member removably mounted above said screen.

2. A mill comprising a main body forming a trough, said body having an outlet-chute and supporting legs integrally formed therewith, an inverted U-shaped lip extending along the rear upper marginal edge of said body, a bar extending across the front of said body, semi-circular cleats on the inner sides of the end-walls of said body, a screen removably supported upon said semi-circular cleats, one of the upper marginal edges of said screen being inserted beneath and retained by said inverted U-shaped lip, a lug extending from another edge of said screen, said lug being adapted to be sprung under the said bar, and a revoluble crusher-member removably mounted above said screen, substantially as and for the purposes set forth.

In testimony, that I claim the invention set forth above I have hereunto set my hand this 29th day of March 1910.

JOSEPHINE KOERNER.

Witnesses:
KAROLINE ENGELBERG,
FREDK. H. W. FRAENTZEL.